(12) United States Patent
Sugimoto

(10) Patent No.: US 8,089,558 B2
(45) Date of Patent: Jan. 3, 2012

(54) GAMUT ERROR NOTIFYING DEVICE

(75) Inventor: Yoshitaka Sugimoto, Kanagawa (JP)

(73) Assignee: Sony Corporation (JP)

( * ) Notice: Subject to any disclaimer, the term of this patent is extended or adjusted under 35 U.S.C. 154(b) by 449 days.

(21) Appl. No.: 12/311,989

(22) PCT Filed: Apr. 18, 2008

(86) PCT No.: PCT/JP2008/057593
§ 371 (c)(1),
(2), (4) Date: Apr. 17, 2009

(87) PCT Pub. No.: WO2009/025102

PCT Pub. Date: Feb. 26, 2009

(65) Prior Publication Data
US 2009/0261984 A1    Oct. 22, 2009

(30) Foreign Application Priority Data

Aug. 20, 2007  (JP) ................................ 2007-214042

(51) Int. Cl.
*H04N 5/50* (2006.01)
*H04N 17/02* (2006.01)

(52) U.S. Cl. ........................................ 348/569; 348/184

(58) Field of Classification Search .................. 348/180, 348/184, 645, 649, 569, 607, 624, 625, 630, 348/564, 563, 567, 570; 345/589, 590; *H04N 17/02, H04N 5/50, 5/445, 5/21, 9/68, 9/64*
See application file for complete search history.

(56) References Cited

U.S. PATENT DOCUMENTS

| | | | |
|---|---|---|---|
| 4,707,727 A | 11/1987 | Penney | |
| 5,311,295 A | 5/1994 | Tallman et al. | |
| 7,071,965 B2 | 7/2006 | Baker | |
| 7,129,957 B2 * | 10/2006 | Kim | .............................. 345/589 |
| 7,327,384 B2 | 2/2008 | Ivers | |
| 7,405,748 B2 | 7/2008 | Shiozawa | |

FOREIGN PATENT DOCUMENTS

| | | | |
|---|---|---|---|
| JP | 62-239785 A | 10/1987 | |
| JP | 06-303648 A | 10/1994 | |
| JP | 2004-260284 A | 9/2004 | |
| JP | 2004-336781 A | 11/2004 | |
| JP | 2005-012802 A | 1/2005 | |

* cited by examiner

*Primary Examiner* — Sherrie Hsia
(74) *Attorney, Agent, or Firm* — Lerner, David, Littenberg, Krumholz & Mentlik, LLP

(57) ABSTRACT

The object is to enable the user to selectively set the notification of a gamut error and notification deactivation condition. For this, a detection unit 3 detecting a gamut error of an input image signal, and a plurality of notifying units 5, 8 and 6, 9 and 11 notifying that a gamut error has occurred in different methods from each other are provided. And, a setting unit 15 carrying out the operation of setting which of these notifying units is to be caused to carry out notification and the operation of setting the condition for deactivating notification of a gamut error is provided. The information indicating the setting result by the setting unit 15 is stored in a storage unit 14. Further, under control of a control unit 13, based on that a gamut error has been detected by the detection unit 3, the notifying units indicated by the information acquired from the storage unit 14 is caused to carry out notification of a gamut error and deactivation of notification of a gamut error under the condition indicated by the information.

6 Claims, 7 Drawing Sheets

FIG. 2

| DETECTION TARGET SIGNAL | UPPER LIMIT THRESHOLD VALUE | | | LOWER LIMIT THRESHOLD VALUE | | |
|---|---|---|---|---|---|---|
| | Cr/R SIGNAL | Y/G SIGNAL | Cb/B SIGNAL | Cr/R SIGNAL | Y/G SIGNAL | Cb/B SIGNAL |
| INPUT SIGNAL D/HD-SDI YCbCr 10Bit | 1004 | 983 | 1004 | 19 | 20 | 19 |
| INPUT SIGNAL HD-SDI RGB 10Bit | 983 | 983 | 983 | 20 | 20 | 20 |
| INPUT SIGNAL HD-SDI YCbCr 12Bit | 4019 | 3935 | 4019 | 77 | 80 | 77 |
| INPUT SIGNAL HD-SDI RGB 12Bit | 3935 | 3935 | 3935 | 80 | 80 | 80 |

GAMUT ERROR NOTIFYING DEVICE

CROSS-REFERENCES TO RELATED APPLICATIONS

The present application is a national phase entry under 35 U.S.C. §371 of International Application No. PCT/JP2008/057593 filed Apr. 18, 2008, published on Feb. 26, 2009 as WO 2009/025102 A1, which claims priority from Japanese Patent Application No. JP 2007-214042 filed in the Japanese Patent Office on Aug. 20, 2007.

TECHNICAL FIELD

The present invention relates to a device detecting and notifying a gamut error of an input image signal, and in particular relates to a device that can selectively set the gamut error notifying means and the condition for deactivating notification of a gamut error.

BACKGROUND ART

In image signals, upper and lower limits of effective amplitude levels are defined based on respective signal formats, and if a signal deviates from a region between the upper and lower limits (gamut as the whole region that can be treated as the effective image signal), it becomes unable to accurately reproduce color.

Therefore, as a monitor for displaying images, there has been existed the one having the function of detecting a gamut error of an input image signal. In such conventional monitor, occurrence of a gamut error has been notified to the user only by one kind of means such that in a frame in which a gamut error has been detected, a zebra pattern (stripe pattern) is superimposed to be displayed in a pixel position where the gamut error has been detected, of an image to be screen-displayed in a monitor.

Also, in the literature, as the technology having a feature in the gamut error notifying means, there have been proposed a technology that has made the amount and direction of a gamut error visibly easy to understand by displaying input image signals as waveforms (Pareto display) (for example, Japanese Unexamined Patent Application Publication No. Hei6-303648 published by Japanese Patent Office), and a technology to display the input image signal in monochrome and the portion of a pixel position where a gamut error has been detected in color using the color corresponding to the error state (for example, Japanese Unexamined Patent Application Publication No. 2005-12802 published by Japanese Patent Office). However, even in the technologies described in those literatures, only one kind of gamut error notifying means is provided.

Meanwhile, in the conventional gamut error notifying means as described above, there exist good points and bad points that are peculiar to them. For example, in the notifying means displaying a zebra pattern, there is a good point that the original image can be avoided from being hidden so much on the screen, but on the other hand, there exists a bad point that when the occurrence region of a gamut error is small, the display region of the zebra pattern also becomes small, so that it is easy to be overlooked (particularly, in moving images, because the display position of the zebra pattern changes for each frame, it is easy to be overlooked).

And, what the user desires to prioritize when monitoring gamut errors (for example, to prioritize not hiding the original image so much, or to prioritize making notification of a gamut error not to be easily overlooked even at the expense of hiding the original image) varies from one user to another, and may differ even for the same user depending on the purpose of monitoring gamut errors.

However, in the conventional monitors and technologies described in conventional literatures, because only one kind of gamut error notifying means is provided, it was not always possible to monitor gamut errors in the manner the user desires.

Further, with respect to the condition for deactivating the notification after notifying occurrence of a gamut error also, there exist good and bad points peculiar to respective conditions. For example, under the condition that notification is deactivated in a frame in which the gamut error has become undetectable (that is, notification is carried out only in the frame in which the gamut error has been detected), there exists a good point that it can be clearly recognized whether or not the gamut error is occurring in the present frame, but on the other hand, there exists a bad point that when the occurrence of a gamut error has been in an instance, the user is easy to overlook the notification.

Also, what condition the user desires as the condition for deactivating notification of a gamut error varies from one user to another, and even for the same user, the condition may differ depending on the purpose of monitoring gamut errors.

Consequently, the present invention addresses providing a gamut error notifying device enabling the user to selectively set the gamut error notifying means and the condition for deactivating notification of a gamut error.

DISCLOSURE OF THE INVENTION

To solve this, a gamut error notifying device according to the present invention is provided with a gamut error detection means detecting a gamut error of an input image signal, and a plurality of notifying means notifying that a gamut error has occurred in different methods from each other. And, a setting means carrying out an operation of setting which of these notifying means is to be caused to carry out notification and an operation of setting the condition for deactivating notification of a gamut error is provided. The information indicating a setting result by the setting means is stored in a storage means. Further, under control of a control means, based on that a gamut error has been detected by the detection means, a notifying means indicated by the information acquired from the storage means is caused to carry out notification of a gamut error and deactivation of notification of a gamut error under the condition indicated by the information.

In this gamut error notifying device, a plurality of notifying means that notify occurrence of a gamut error in different methods from each other are provided, and a setting means for carrying out the operation of setting which of the plurality of notifying means is to be caused to notify a gamut error and the operation of setting the condition for deactivating notification of a gamut error is provided.

If the user carries out the operation of setting which notifying means is to be caused to notify a gamut error and the operation of setting the condition for deactivating notification of a gamut error with the setting means according to the purpose of monitoring gamut errors, etc., the information indicating the setting result is stored in the storage means.

Thereafter, if a gamut error is detected in an input image signal by the gamut error detection means, the control means acquires the information indicating this setting result from the storage means, and causes the notifying means of the plurality of notifying means, indicated by the information, to carry out notification of a gamut error and deactivation of notification of a gamut error under the condition indicated by the information.

Thereby, occurrence of a gamut error is notified by the notifying means set by the user, and the notification is deactivated under the condition set by the user.

According to the present invention, it is configured to notify that a gamut error has occurred in different methods from each other, and of such different methods, by the notifying method set by the user, occurrence of a gamut error is notified, and the notification is deactivated by the condition set by the user. Accordingly, the effect such that it is possible to enhance the convenience when the user monitors gamut errors can be obtained.

BRIEF DESCRIPTION OF THE DRAWINGS

FIG. 2 is a diagram illustrating default values used as references for gamut error detection in the master monitor of FIG. 1.

BEST MODE FOR CARRYING OUT THE INVENTION

Below, an example of an embodiment in which the present invention has been adopted in a master monitor (monitor used for carrying out checking of the image quality in the field of television broadcasting stations, video productions, etc.) is concretely described using drawings.

Figure 1:
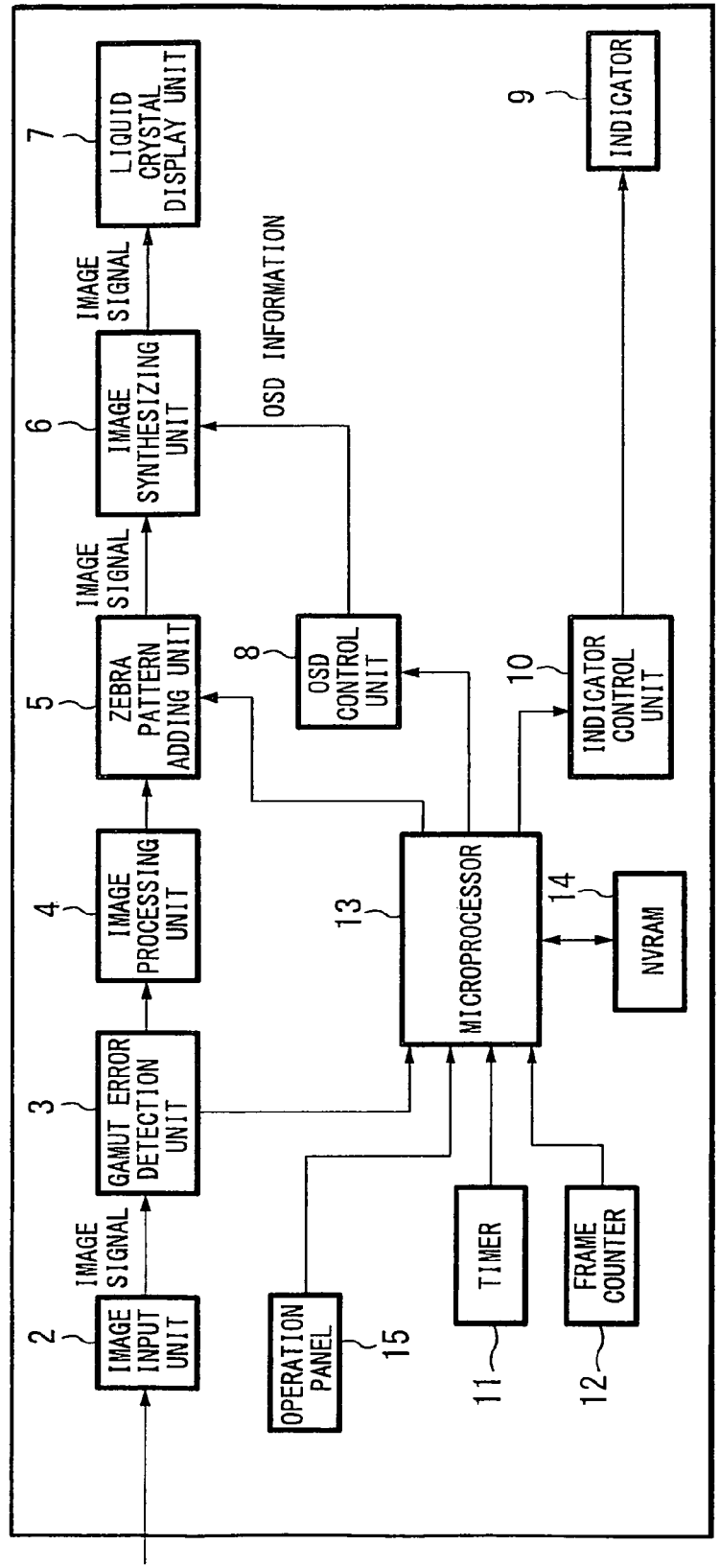
FIG. 1 is a block diagram illustrating a circuit configuration of a master monitor adopting an example of an embodiment of the present invention.

FIG. 1 is a block diagram illustrating a circuit configuration of a master monitor in which the present invention has been adopted. In this master monitor 1, an image input unit 2, a gamut error detection unit 3, an image processing unit 4, a zebra pattern adding unit 5, an image synthesizing unit 6, a liquid crystal display unit 7, and an OSD (on-screen display) control unit 8 are provided. Also, in the master monitor 1, an indicator 9 constituted by an LED lamp, etc., an indicator control unit 10 controlling the lighting condition of the indicator 9, a timer 11, a frame counter 12, a microprocessor 13, a NVRAM (non-volatile RAM) 14, and an operation panel 15 are provided.

Figure 5:
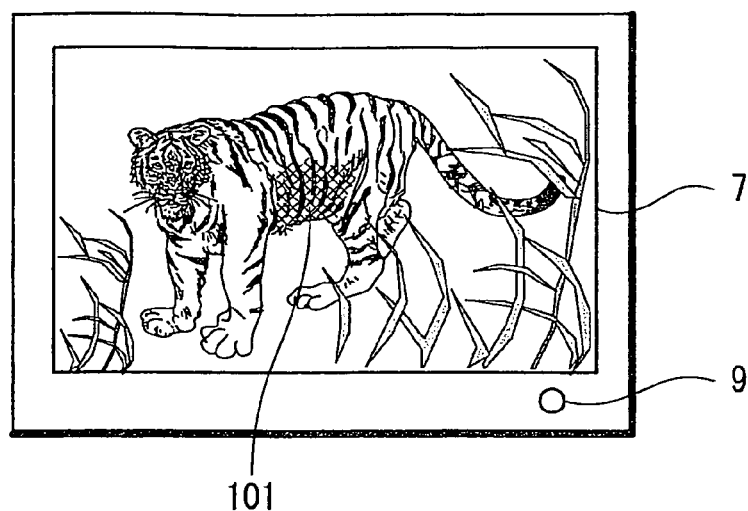
FIG. 5 is a diagram illustrating a display example (example of a zebra pattern) according to an example of an embodiment of the present invention.

The indicator 9 is arranged, for example as illustrated in FIG. 5, below the liquid crystal screen of the liquid crystal display unit 7. Note that the master monitor 1 may be configured such that the liquid crystal display unit 7, the indicator 9, and the indicator control unit 10 are separated, as the monitor main body, from the other parts. Further, the operation panel 15 also may be a remote controller separated from the other parts.

The image input unit 2 is a circuit that inputs digital image signals in the signal formats of the following four kinds (1)-(4), which are serially transmitted, and decodes those image signals (NRZ conversion, descrambling, parallel conversion).

(1) D1/HD-SDI YCbCr 10-bit
(2) HD-SDI RGB 10-bit
(3) HD-SDI YCbCr 12-bit
(4) HD-SDI RGB 12-bit The input image signal decoded by the image input unit 2 is sent to the gamut error detection unit 3. The gamut error detection unit 3 is a circuit that detects a gamut error by determining, for each data of individual pixels (dots) of the input image signal, if the amplitude level of the data deviates from the effective amplitude level in the signal format of the input image signal.

The upper limit and lower limit threshold values of the amplitude level which the gamut error detection unit 3 uses as references for gamut error detection are set to default values as shown in FIG. 2 for each signal format, when the master monitor 1 is shipped from the factory. In FIG. 2, the threshold values for the image signal of 10-bit are expressed at the level when the maximum level of the signal is $2^{10}-1=1023$, and the threshold values for the image signal of 12-bit are expressed at the level when the maximum level of the signal is $2^{12}-1=4095$.

The microprocessor 13 of FIG. 1 is a processor that controls respective parts of the master monitor 1. The default values illustrated in FIG. 2 are stored in a ROM in the microprocessor 13.

Further, in the operation panel 14, the operation of setting values that are different from the default values illustrated in FIG. 2, for each signal format, as the upper limit and lower limit threshold values of the amplitude level which the gamut error detection unit 3 uses as references for gamut error detection, is enabled. The threshold values set in the operation panel 14 are stored in the NVRAM 14 by the microprocessor 13.

When the threshold values are stored in the NVRAM 14, the microprocessor 13 causes the gamut error detection unit 3 to carry out the gamut error detecting operation using the stored threshold values as references for gamut error detection. Further, when no threshold values are stored in the NVRAM 14, the microprocessor 13 causes the gamut error detection unit 3 to carry out the gamut error detecting operation using the default values stored in the ROM as references for gamut error detection.

The image signal output from the gamut error detection unit 3 is sent to the image processing unit 4. The image processing unit 4 is a circuit that carries out to the image signal, processing for converting the YCbCr signal to the RGB signal and processing for converting the interlaced image signal to the progressive method. Also, the image processing unit 4 is provided with a circuit that carries out processing to change the size of the image signal to match the display size of the liquid crystal display unit 12, processing to realize in the liquid crystal monitor the color reproducing characteristic close to that of the CRT monitor (color matching), etc.

The image signal output from the image processing unit 4 is sent to the zebra pattern adding unit 5. The zebra pattern adding unit 5 is a circuit that adds image data, which displays a zebra pattern (stripe pattern), in the image signal.

The image signal output from the zebra pattern adding unit 5 is sent to the image synthesizing unit 6. The image synthesizing unit 6 is a circuit that synthesizes image data of characters and figures sent from the OSD control unit 8 in the image signal.

The image signal output from the image synthesizing unit 6 is sent to the liquid crystal display unit 7 and is displayed in the liquid crystal screen.

In the master monitor 1, it is enabled to notify that the gamut error has occurred by means of the following three kinds of notifying means (a)-(c) in the methods different from each other.

(a) The notifying means that is constituted by the zebra pattern adding unit 5 and that superimposes a zebra pattern (stripe pattern) to be displayed, in a frame in which the gamut error has been detected, in the pixel position where the gamut error has been detected, of an image to be displayed in the liquid crystal display unit 7.

(b) The notifying means that is constituted by the OSD control unit 8 and the image synthesizing unit 6 and that displays that the gamut error has occurred in the liquid crystal display unit 7 by means of the on-screen display function.

(c) The notifying means that is constituted by the indicator 9 and the indicator control unit 10 and that indicates that the gamut error has occurred by lighting of the indicator 9.

FIG. 5 is a diagram illustrating a notification example of the above-described (a). That is, an example that a zebra pattern (stripe pattern) 101 is superimposed to be displayed in the pixel position where the gamut error has been detected of an image to be displayed in the liquid crystal display unit 7 is shown.

Figure 6:
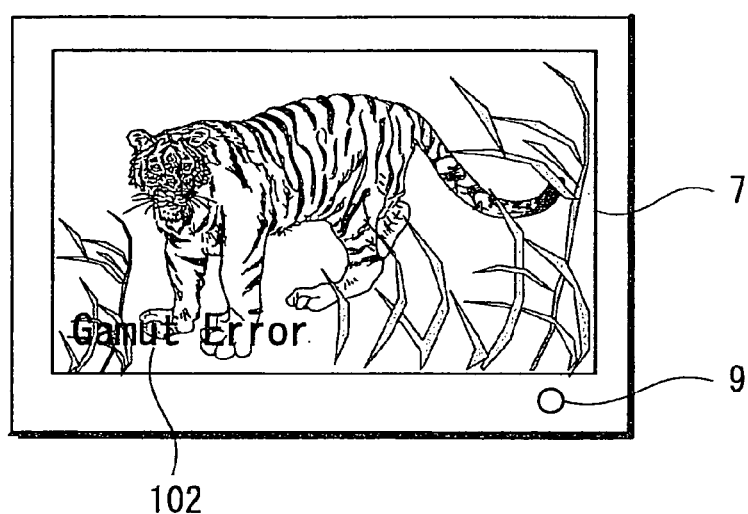
FIG. 6 is a diagram illustrating a display example (example of character display) according to an example of an embodiment of the present invention.

FIG. 6 is a diagram illustrating a notification example of the above-described (b). An example that in a predetermined position such as the left corner, etc. of an image to be displayed in the liquid crystal display unit 7, a character display 102 of "Gamut Error" indicating that the gamut error has occurred is superimposed to be displayed by means of the on-screen display function is shown. The position for carrying out the character display 102 is one example, and is not limited to this example. The character display 102 may be blinking display, besides a continuous display form.

Figure 7:
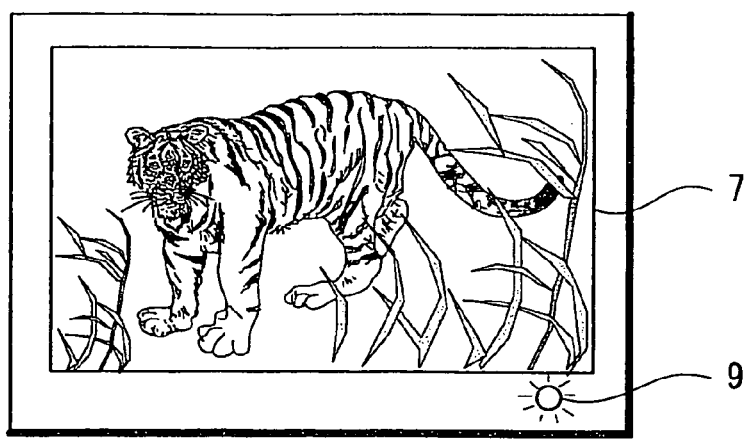
FIG. 7 is a diagram illustrating a display example (example of indicator lighting) according to an example of an embodiment of the present invention.

FIG. 7 is a diagram illustrating a notification example of the above-described (c). An example that the indicator 9 constituted by an LED lamp, etc., arranged in the lower right side part of the liquid crystal display unit 7, is lighted or blinked is shown. The position where the indicator 9 is arranged, illustrated in FIG. 7, is one example, and the indicator 9 may be arranged in other positions. Further, the indicator 9 may be shared by an indicator carrying out notification by other functions.

These notification processes of FIG. 5, FIG. 6, and FIG. 7 may be set to be executed in combination by setting of the notifying means. That is, for example, it may be set such that displaying of the zebra pattern 101 illustrated in FIG. 5 and the character display 102 illustrated in FIG. 6 are carried out at the same time. Further, it may be set such that either (or both) of displaying of the zebra pattern 101 illustrated in FIG. 5 and the character display 102 illustrated in FIG. 6 and lighting of the indicator 9 illustrated in FIG. 7 are carried out at the same time.

These notifying means (a)-(c) are notifying means that respectively have the following good points and bad points.

(a) There exists a good point that the original image can be avoided from being hidden so much on the screen, but on the other hand, there exists a bad point that when the occurrence region of the gamut error is small, the display region of the zebra pattern also becomes small, so that it is easy to be overlooked (particularly, in moving images, because the display position of the zebra pattern changes for each frame, it is easy to be overlooked).

(b) There exists a good point that because the sizes and positions of characters and figures displayed by the on-screen display function are constant, even when the occurrence region of the gamut error is small, there is little risk of overlooking, but on the other hand, there exists a bad point that the original image is hidden.

(c) There exists a good point that because notification is carried out by the indicator 9 that is separate from the liquid crystal display unit 7, the original image will not have to be hidden at all on the screen, but on the other hand, there exists a bad point that it is easy to be overlooked if the user is paying particular attention to the screen.

In the operation panel 15, it is enabled to carry out the setting operation of selecting, as the notifying means to be actually caused to notify the gamut error, arbitrary one, or two or more notifying means of the above-described notifying means (a)-(c) (hereinafter called "notifying means setting operation").

Also, in the operation panel 15, it is enabled to carry out the operation of instructing deactivation of the notification of a gamut error while the user is notified of the gamut error by the notifying means set by this notifying means setting operation (hereinafter called "deactivation instructing operation").

Also, in the operation panel 15, it is enabled to carry out the setting operation of selecting, as the condition for deactivating notification of a gamut error, any of the following three kinds of conditions (d)-(f) (hereinafter called "deactivation condition setting operation").

(d) The condition that notification is deactivated in the frame in which the gamut error has become undetectable (that is, notification is carried out only in the frame in which the gamut error has been detected).

(e) The condition that notification is deactivated after the lapse of a given period of time after starting the notification (f) The condition that notification is deactivated at the time the deactivation instructing operation has been carried out in the operation panel 15.

However, with respect to the zebra pattern, due to the nature that it is "displayed in the pixel position where the gamut error has been detected, in a frame in which the gamut error has been detected", it is configured such that the condition (d) is forcibly set and the condition (e) or (f) cannot be set.

Note that it may be configured such that the notifying means setting operation, the deactivation instructing operation, and the deactivation condition setting operation are carried out by providing dedicated operation buttons in the operation panel 15, or it may be configured such that these operations are carried out by displaying setting screens for carrying out these operations in the display unit provided in the operation panel 15.

FIG. 8 through FIG. 11 are diagrams illustrating examples when the setting screen of "GAMUT ERROR" is displayed in the liquid crystal display unit 7 or dedicated display unit by the operation of the operation panel 15.

As illustrated in FIG. 8 through FIG. 11, in the uppermost column of each setting screen, it is displayed as "GAMUT ERROR", indicating that it is the setting screen of the gamut error.

To explain respective setting items shown in FIG. 8 through FIG. 11, by selecting the item of "GAMUT ERROR DISPLAY" to ON or OFF, it is possible to select whether or not to carry out notification of a gamut error.

By selecting the item of "NOTIFICATION" to either of LED, OSD, and LED&OSD, it is possible to select respective notifying modes.

By selecting the item of "NOTIFICATION DEACTIVATION" to AUTOMATIC or MANUAL, it is possible to select respective states that notification is deactivated.

By selecting the item of "ZEBRA PATTERN" to ON or OFF, it is possible to select whether or not to carry out notification by the zebra pattern.

Note that in the examples of setting screens of FIG. 8 through FIG. 11, respective items are shown in the states that they can be selected, however, it may be configured such that only one item, that has been selected for example by the cursor operation, etc., is put in a selectable display state and the other items are put in a determined display state.

Figure 8:
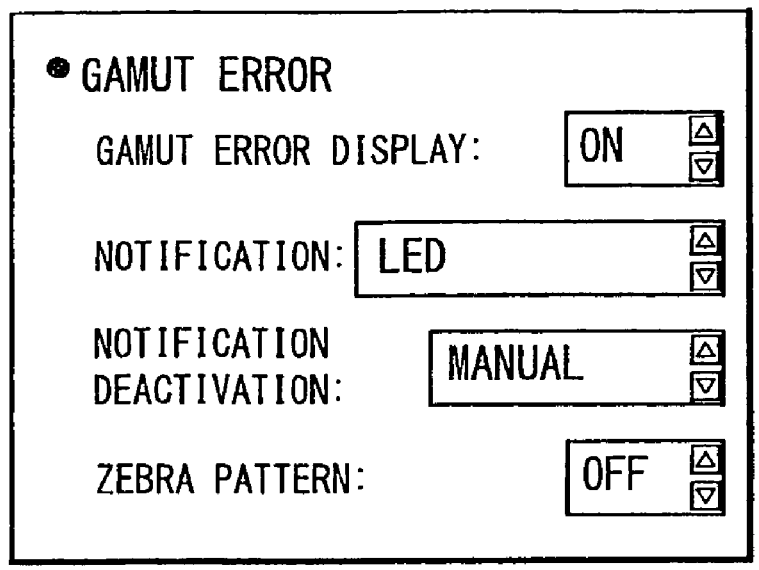
FIG. 8 is a diagram illustrating an example of a setting screen according to an example of an embodiment of the present invention.

Concrete examples of respective setting screens shown in FIG. 8 through FIG. 11 are explained. In the example of FIG. 8, the item of the gamut error display is set to ON and it is selected to carry out notification of a gamut error. The item of notification is set to LED and it is selected to carry out notification by the indicator 9 (notification of FIG. 7). The item of notification deactivation is set to MANUAL and it is selected to deactivate notification at the time the deactivation instructing operation has been carried out in the operation panel 15. The item of zebra pattern is set to OFF and it is selected not to carry out zebra pattern display.

Figure 9:
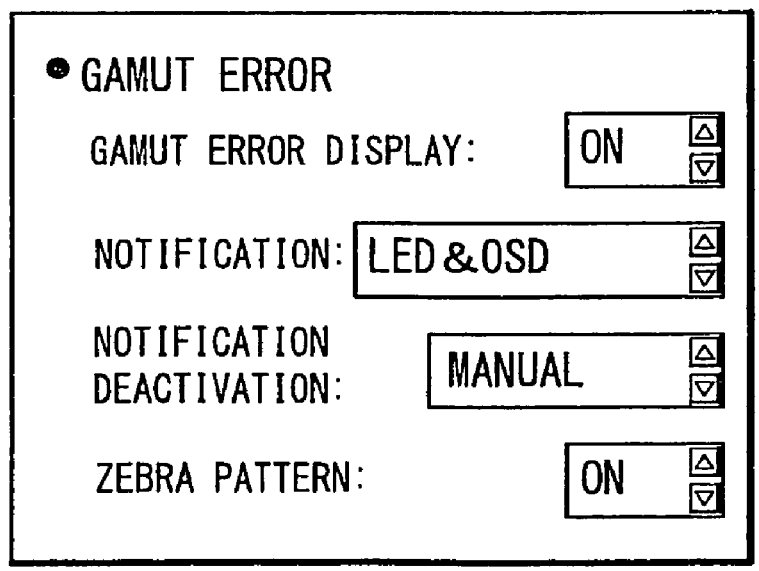
FIG. 9 is a diagram illustrating an example of a setting screen according to an example of an embodiment of the present invention.

In the example of FIG. 9, the item of gamut error display is set to ON and it is selected to carry out gamut error notification. The item of notification is set to LED&OSD and it is selected to carry out both of notification by the indicator 9 (notification of FIG. 7) and notification by the on-screen display function (notification of FIG. 6). The item of notification deactivation is set to MANUAL and it is selected to deactivate notification at the time the deactivation instructing operation has been carried out in the operation panel 15. The item of zebra pattern is set to ON and it is selected to carry out zebra pattern display illustrated in FIG. 5.

Figure 10:
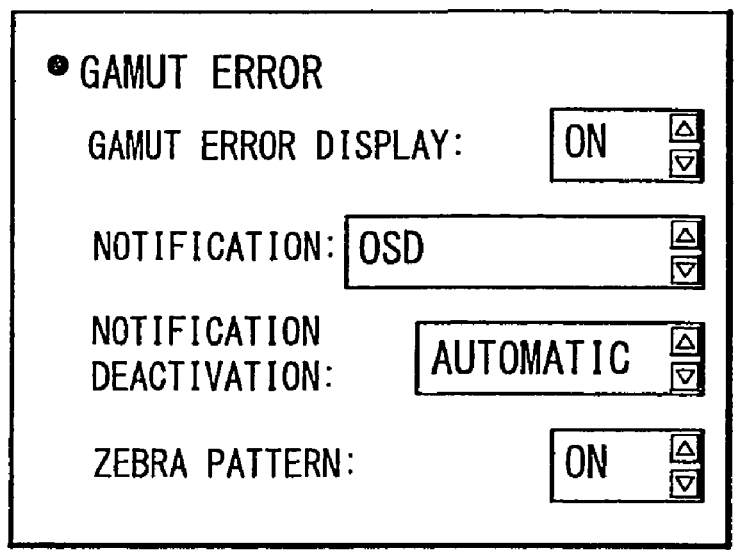
FIG. 10 is a diagram illustrating an example of a setting screen according to an example of an embodiment of the present invention.

In the example of FIG. 10, the item of the gamut error display is set to ON and it is selected to carry out gamut error notification. The item of notification is set to OSD and it is selected to carry out notification by the on-screen display function (notification of FIG. 6). The item of notification deactivation is set to AUTOMATIC and it is selected to deactivate notification after the lapse of a given period of time after starting the notification. The item of zebra pattern is set to ON and it is selected to carry out zebra pattern display illustrated in FIG. 5.

Figure 11:
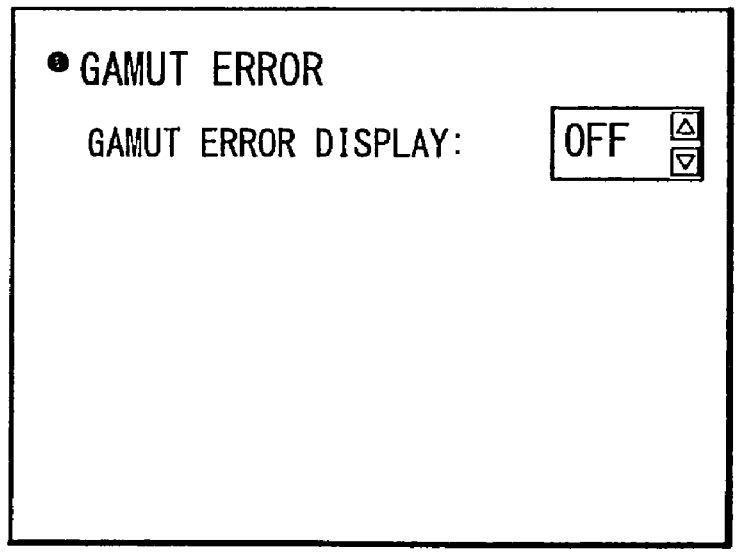
FIG. 11 is a diagram illustrating an example of a setting screen according to an example of an embodiment of the present invention.

In the example of FIG. 11, the item of gamut error display is set to OFF and it is selected not to carry out gamut error notification. In the example in FIG. 11, by making this selection of not to carry out gamut error notification, it is put in the state that displaying of the other detailed items is not carried out.

The examples of setting screens shown in FIG. 8 through FIG. 11 are shown as preferred ones, and as the setting screen, it is not limited to these examples.

Figure 3:
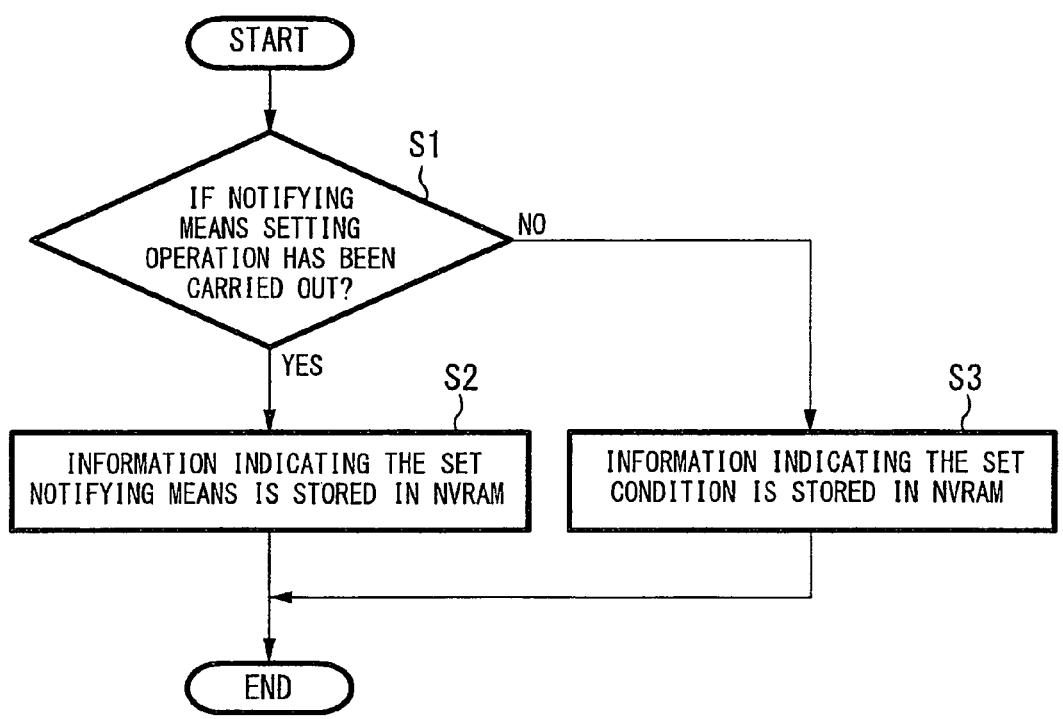
FIG. 3 is flowchart illustrating a notification/deactivation condition setting and storing process which the microprocessor of FIG. 1 executes.

FIG. 3 is a flowchart illustrating a notifying means/deactivation condition setting and storing process which the microprocessor 13 (FIG. 1) executes based on that a notifying means setting operation or a deactivation condition setting operation has been carried out in the operation panel 15.

The notifying means/deactivation condition setting and storing process starts based on that either the notifying means setting operation or the deactivation condition setting operation has been carried out, and first, it is determined if the notifying means setting operation has been carried out (step S1).

When the answer is YES, the information indicating the notifying means set by the notifying means setting operation (one, or two or more of the above-described (a)-(c)) is stored in the NVRAM 14 (when this information has been already stored by the notifying means/deactivation condition setting and storing process executed in the past, the stored content is updated) (step S3). Then, the notifying means/deactivation condition setting and storing process ends.

When the answer has been NO in step S1 (when the deactivation condition setting operation has been carried out), the information indicating the condition set by the deactivation condition setting operation (any of the above-described (d)-(f)) is stored in the NVRAM 14 (when this information has been already stored by the process executed in the past, the stored content is updated) (step S3). Then, the notifying means/deactivation condition setting and storing process ends.

By this notifying means/deactivation condition setting and storing process, setting results of the notifying means setting operation and the deactivation condition setting operation are saved.

Figure 4:
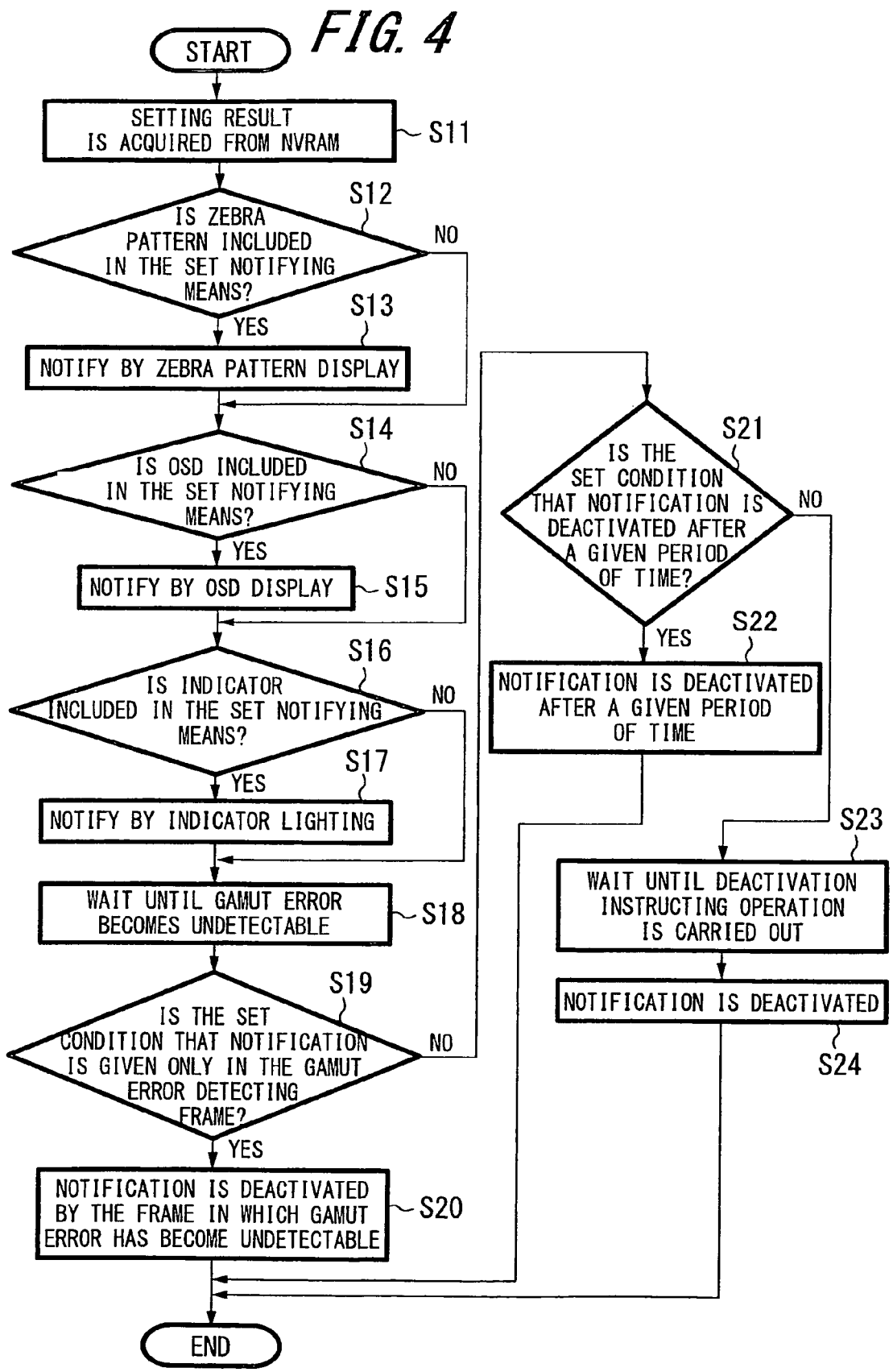
FIG. 4 is a flowchart illustrating a gamut error notifying process which the microprocessor of FIG. 1 executes.

FIG. 4 is a flowchart illustrating a gamut error notifying process the microprocessor 13 executes based on that a gamut error has been detected in the input image signal by the gamut error detection unit 3 (FIG. 1).

This gamut error notifying process starts based on that the gamut error has been detected by the gamut error detection unit 3, and first, the setting results saved by the notifying means/deactivation condition setting process (FIG. 3) (the information indicating the notifying means, stored by step S2, and the information indicating the condition, stored by step S3) is acquired from the NVRAM 14 (step S11).

Then, from the acquired setting results, it is determined if the above-described notifying means (a) (zebra pattern display) is included in the notifying means set by the notifying means setting operation (step S12).

If the answer is YES, by controlling the zebra pattern adding unit 5 (FIG. 1), in the frame in which a gamut error has been detected, the zebra pattern is superimposed to be displayed in the pixel position where the gamut error has been detected, of the image to be displayed in the liquid crystal display unit 7 (step S13). Then, the process proceeds to step S14. On the other hand, when the answer has been NO in step S12, the process proceeds to step S14 directly.

In step S14, it is determined if the above-described notifying means (b) (on-screen display) is included in the notifying means set by the notifying means setting operation.

If the answer is YES, by controlling the OSD control unit 8 (FIG. 1), the error message indicating that the gamut error has occurred (for example, the characters expressing "gamut error") is on-screen-displayed in the liquid crystal display unit 7 (step S15). Then, the process proceeds to step S16. On the other hand, when the answer has been NO in step S14, the process proceeds to step S16 directly.

In step S16, it is determined if the above-described notifying means (c) (lighting of the indicator 9) is included in the notifying means set by the notifying means setting operation.

If the answer is YES, by controlling the indicator control unit 10, the indicator 9 that is not lighted usually is lighted (step S17). Then, the process proceeds to step S18. On the other hand, when the answer has been NO in step S16, the process proceeds to step S18 directly.

In step S18, it is waited until the gamut error becomes undetectable by the gamut error detection unit 3.

If the gamut error has become undetectable, from the setting results acquired in step S1, it is determined if the condition set by the deactivation condition setting operation is the above-described condition (d) (notify only in the frame in which the gamut error has been detected) (step S19).

If the answer is YES, while referring to the frame information from the frame counter 12 (FIG. 1), the notifying means caused to notify the gamut error in steps S13, S15, S17 are caused to deactivate notification in the frame in which the gamut error has become undetectable. That is, when the zebra pattern has been displayed in step S13, displaying of the zebra pattern is eliminated in the frame in which the gamut error has become undetectable. Further, when the error message has been on-screen-displayed in step S15, on-screen display is eliminated in the frame in which the gamut error has become undetectable. Also, when the indicator 9 has been lighted in step S17, the indicator 9 is turned off in the frame in which the gamut error has become undetectable (step S20). Then, the gamut error notifying process ends.

On the other hand, when the answer has been NO in step S19, it is determined if the condition set by the deactivation condition setting operation is the above-described condition (e) (deactivation after a given period of time) (step S21).

If the answer is YES, while referring to the time information from the timer 11, the notifying means caused to notify the gamut error in steps S13, S15, S17 are caused to deactivate notification after a given period of time (for example, after 3 seconds) (however, with respect to the zebra pattern, as described above, displaying is forcibly eliminated in the frame in which the gamut error has become undetectable) (step S22). Then, the gamut error notifying process ends.

On the other hand, when the answer has been NO in step S21, that is, when the condition set by the deactivation condition setting operation has been the above-described condition (f) (deactivation at the time of the deactivation instructing operation), it is waited until the deactivation instructing operation is carried out in the operation panel 15.

Then, if the deactivation instructing operation is carried out, at that time, the notifying means caused to notify the gamut error in steps S13, S15, S17 are caused to deactivate notification (step S24). Then, the gamut error notifying process ends.

In the master monitor 1 with the configuration described above, it is possible for the user to carry out setting of which notifying means of the plurality of notifying means (above-described notifying means (a)-(c)) notifying occurrence of a gamut error in different methods from each other is to be caused to notify the gamut error, and setting of the condition for deactivating notification of a gamut error (any of the above-described conditions (d)-(f)) according to the purpose of monitoring gamut errors, etc.

For example, when the user desires to prioritize making notification of a gamut error hard to be overlooked even at the expense of hiding the original image, it is only necessary to set the above-described notifying means (b) (on-screen display) and to set the above-described condition (e) (deactivation after a given period of time) or the above-described condition (f) (deactivation at the time of the deactivation instructing operation).

Also, for example, when the user desires to prioritize not hiding the original image at all, it is only necessary to set the above-described notifying means (c) (indicator 9). Even in such case, if the above-described condition (f) (deactivation at the time of the deactivation instructing operation) is set for example, notification by the indicator 9 is continued until the user carries out the deactivation instructing operation, so that the bad point that it is easy to be overlooked can be suppressed as much as possible.

After setting has been made as described above, if a gamut error is detected in the input image signal by the gamut error detection unit 3, occurrence of a gamut error is notified by the notifying means set by the user, and the notification is deactivated under the condition set by the user. Thereby, it is possible to enhance the convenience when the user monitors gamut errors.

Note that in the above-described embodiment, the setting operation of the condition for deactivating notification of a gamut error is set to be collectively carried out, independently of what kind of notifying means is being set. However, as another example, it may be configured such that when two or more notifying means have been set, the setting operation of the notification deactivation condition can be carried out for each of the notifying means. Thereby, for example when the notifying means (a) and (b) (on-screen display and indicator 9) have been set, it becomes possible, for the on-screen display, to limit the period of time during which the original image is hidden by deactivating notification in the frame in which the gamut error has become undetectable or by deactivating notification after a given period of time, and on the other hand, for the notification by the indicator 9, to continue the notification until the user carries out the deactivation instructing operation.

Also, the notifying means (a)-(c) in the above-described embodiment are just examples, and it may be configured such that a plurality of known notifying means in which the notifying methods are different from each other (including those that carry out not only visual notification but also auditory notification) are provided and the setting operation of setting which one of these plurality of notifying means is to be caused to notify the gamut error can be carried out in the operation panel 15.

Further, the notification deactivation conditions (d)-(f) in the above-described embodiment are just examples, and it may be configured such that the setting operation of different conditions (for example, the condition that having made it possible to input the number of frames, notification is deactivated after the lapse of the period of time corresponding to the input number of frames) can be carried out in the operation panel 15.

Further, in the above-described embodiment, the present invention has been adopted in the master monitor. However, the present invention can be adopted in the monitor for displaying images, other than the master monitor, and further, can be adopted in apparatuses other than the monitor in which image signals are input (for example, image recording apparatuses).

EXPLANATION OF REFERENCE NUMERALS

1: master monitor, 2: image input unit, 3: gamut error detection unit, 4: image processing unit, 5: zebra pattern adding unit, 6: image synthesizing unit, 7: liquid crystal display unit, 8: OSD control unit, 9: indicator, 10: indicator control unit, 11: timer, 12: frame counter, 13; microprocessor, 14: NVRAM, 15: operation panel

The invention claimed is:
1. A gamut error notifying device, comprising:
 a gamut error detection means detecting a gamut error of an input image signal;

a plurality of notifying means notifying that a gamut error has occurred in different methods from each other;

a setting means for carrying out an operation of setting which notifying means of the plurality of notifying means is to be caused to notify a gamut error and an operation of setting a condition for deactivating notification of a gamut error;

a storage means storing information indicating a setting result by the setting means; and a control means acquiring, based on that a gamut error has been detected by the gamut error detection means, information indicating the setting result from the storage means and causing a notifying means of the plurality of notifying means, indicated by the information, to carry out notification of a gamut error and deactivation of notification of a gamut error under a condition indicated by the information.

2. The gamut error notifying device described in claim 1, further comprising a display means for displaying an image of an input image signal, wherein the plurality of notifying means include a means superimposing a zebra pattern to be displayed in a portion of a pixel position where a gamut error has occurred, of an image to be displayed in the display means, and a means displaying that a gamut error has occurred by means of an on-screen display function in the display means.

3. The gamut error notifying device described in claim 1, further comprising a display means for displaying an image of an input image signal, and an indicator, wherein the plurality of notifying means include at least either of a means superimposing a zebra pattern to be displayed in a portion of a pixel position where a gamut error has occurred, of an image to be displayed in the display means and a means displaying that a gamut error has occurred by means of an on-screen display function in the display means, and a means indicating that a gamut error has occurred by means of a lighting condition of the indicator.

4. The gamut error notifying device described in claim 1, wherein in the setting means, as the condition for deactivating notification of a gamut error, a condition that notification is deactivated in a frame in which the gamut error has become undetectable and a condition that notification is deactivated after the lapse of a given period of time after starting the notification can be set.

5. The gamut error notifying device according to claim 1,
further comprising an instructing means for carrying out an operation of instructing deactivation of notification of a gamut error, wherein in the setting means, as a condition for deactivating notification of a gamut error, at least either of a condition that notification is deactivated in a frame in which the gamut error has become undetectable and a condition that notification is deactivated after the lapse of a given period of time after starting the notification, and a condition that notification is deactivated at the time the instructing means has been operated can be set.

6. A gamut error notifying device, comprising:

a gamut error detection unit detecting a gamut error of an input image signal;

a plurality of notifying units notifying that a gamut error has occurred in different methods from each other;

a setting unit for carrying out an operation of setting which notifying means of the plurality of notifying units is to be caused to notify a gamut error and an operation of setting a condition for deactivating notification of a gamut error;

a storage unit storing information indicating a setting result by the setting unit; and a control unit acquiring, based on that a gamut error has been detected by the gamut error detection unit, information indicating the setting result from the storage unit and causing a notifying unit of the plurality of notifying units, indicated by the information, to carry out notification of a gamut error and deactivation of notification of a gamut error under a condition indicated by the information.

* * * * *